US009568363B2

(12) United States Patent
Yu (10) Patent No.: US 9,568,363 B2
(45) Date of Patent: Feb. 14, 2017

(54) COMPACT OPTICAL SPECTROMETER

(71) Applicant: Wisconsin Alumni Research Foundation, Madison, WI (US)

(72) Inventor: Zongfu Yu, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 102 days.

(21) Appl. No.: 14/166,345

(22) Filed: Jan. 28, 2014

(65) Prior Publication Data

US 2015/0211922 A1 Jul. 30, 2015

(51) Int. Cl.
| | |
|---|---|
| G01J 3/02 | (2006.01) |
| G01J 3/28 | (2006.01) |
| G01J 3/12 | (2006.01) |
| G01J 3/42 | (2006.01) |
| G01J 3/26 | (2006.01) |

(52) U.S. Cl.
CPC .. G01J 3/28 (2013.01); G01J 3/12 (2013.01); G01J 3/42 (2013.01); G01J 3/26 (2013.01); G01J 2003/1213 (2013.01); G01J 2003/1239 (2013.01); G01J 2003/1282 (2013.01); G01J 2003/2806 (2013.01)

(58) Field of Classification Search
CPC ................... G01J 3/0205; G01J 3/28
See application file for complete search history.

(56) References Cited

U.S. PATENT DOCUMENTS

| | | | | |
|---|---|---|---|---|
| 6,998,613 | B2* | 2/2006 | Syllaios | G01J 3/51 250/339.02 |
| 7,050,215 | B1* | 5/2006 | Johnson | G01J 3/42 359/260 |
| 2003/0011768 | A1* | 1/2003 | Jung et al. | 356/326 |
| 2004/0207855 | A1* | 10/2004 | Brady | G01J 3/02 356/451 |
| 2008/0252885 | A1* | 10/2008 | Blalock et al. | 356/328 |
| 2011/0080581 | A1* | 4/2011 | Bhargava et al. | 356/302 |
| 2012/0075636 | A1* | 3/2012 | Zilkie | G02F 1/21 356/454 |
| 2013/0003067 | A1* | 1/2013 | Jaworski | 356/433 |
| 2013/0329116 | A1* | 12/2013 | Margalit | G02B 5/287 348/340 |
| 2015/0285677 | A1* | 10/2015 | Lee | G01J 3/2803 348/135 |

OTHER PUBLICATIONS

Gan et al. "A high-resolution spectrometer based on a compact planar two dimensional photonic crystal cavity array". Applied Physics Letters 100, 231104, Jun. 4, 2012.*
Brandon Redding, Seng Fatt Liew, Raktim Sarivia, Hui Cao; On-chip random spectrometer; Eprint arXiv:1304.2951; Apr. 2013; pp. 1-10; US.

(Continued)

Primary Examiner — Kara E Geisel
Assistant Examiner — Dominic J Bologna
(74) Attorney, Agent, or Firm — Boyle Fredrickson, S.C.

(57) ABSTRACT

A spectrometer employs multiple filters having complex filter spectra that can be generated robustly from received light over short optical path lengths. The complex filter spectra provide data that can be converted to a spectrum of the received light using compressed sensing techniques. The result is a more compact, easily manufactured spectrometer.

19 Claims, 4 Drawing Sheets

(56) References Cited

OTHER PUBLICATIONS

Marco F. Duarte, Richard G. Baraniuk; Spectral Compressive Sensing; Journal Article; Applied and Computational Harmonic Analysis: Aug. 1, 2012: pp. 1-32; vol. 35; Issue 1; U.S.
Website:http://www.newport.com/Cornerstone153-260-1-4-m-Monochromator/375108/1033/info.aspx#tab_Overview;Admitted Prior Art; Cornerstone 260 1/4 m Monochromator; Newport Experience Solutions.
Website:http://www.thermoscientific.com/en/product/nicolet-is-50-ft-ir-spectrometer.html; Admitted Prior Art; Thermo Scentific.

* cited by examiner

COMPACT OPTICAL SPECTROMETER

STATEMENT REGARDING FEDERALLY SPONSORED RESEARCH OR DEVELOPMENT

Not Applicable

CROSS REFERENCE TO RELATED APPLICATION

Not Applicable

BACKGROUND OF THE INVENTION

The present invention relates to systems for measuring light spectra, for example, for absorption, transmission, or reflection spectroscopy, and in particular to an optical spectrometer providing compact and robust construction.

Optical spectrometers provide a measurement of light intensity over multiple frequencies. An optical spectrometer may measure the spectrum of an unknown light source or be used with a known light source to measure absorption of a material when light from the known light source passes through or is reflected from the measured material before being detected. This latter absorption spectrum is derived by subtracting the spectrum of the light received at the detector from the spectrum of the known light source.

Distinguishing the intensity of different frequencies of light, as needed for determining a spectrum, is normally accomplished by using an analyzing filter system and a broadband light detector, the latter which does not distinguish among frequencies and is ideally equally sensitive to all frequencies of interest. The analyzing filter system is changed as a function of time so that the broadband light detector receives different frequencies of light as a function of time. In this way the time varying signal from the broadband detector may be decoded into a spectrum providing the intensity of different frequencies of light.

For determining the spectrum of an unknown light source, the analyzing filter system may be applied directly to the light source. For absorption spectroscopy, the analyzing filter system may be placed after a sample to be analyzed, to receive reflected or absorbed light from the sample as illuminated by a known light source. This light is then passed to the detector. Alternatively, the analyzing filter system may be placed in front of the sample to modify the light from a known light source before it is reflected or absorbed by the sample and then received by the broadband detector.

Conventional optical spectrometers may use a frequency dispersive element as an analyzing filter system, such as a diffraction grating. The angle of incidence of the light on the diffraction grating may be changed to generate a series of narrowband monochromatic beams each approximating a single spectral line. Independent measurements of the different monochromatic beams by the detector allow a full spectrum to be assembled. Generally, a slit may be used to successively isolate each narrowband monochromatic beam for sequential measurement by a single detector, or the monochromatic beams may be measured in parallel by a multi-detector array.

Fourier transform spectrometers may use an interferometer as an analyzing filter assembly to produce a light beam having a multi-frequency spectrum approximating a periodic sinusoid with regular zero values for frequencies within the range of interest. This sinusoidal spectrum is generated by reflecting a broadband light beam back on itself so that the light is subject to constructive and destructive interference at different frequencies. The period of the interference may be changed, for example, by moving a mirror of an interferometer, so that the sinusoid of the spectrum is modulated. Generally, higher optical frequencies will have a higher rate of modulation so that measurements made with the broadband detector may be processed by the Fourier transform to reveal a spectrum.

Both of these types of spectrometers require relatively large optical paths for good resolution and may further require complex precision machinery to move optical elements during the measurement process. As a result, low-cost and compact spectrometers, potentially useful in a variety of applications, are difficult to produce.

SUMMARY OF THE INVENTION

The present invention provides an analyzing filter system for a spectrometer that provides a set of uncorrelated and varying filter spectra over an extremely short optical path. Although the filter spectra are complex and appear largely random, they can be assembled into absorption spectrum mathematically, for example, by compressed sensing techniques. The result is a spectrometer that can be both compact and robust.

Specifically then, the present invention provides spectrometer that includes a frequency filter receiving a light beam and modifying the light beam according to a set of different filter spectra each defining a frequency-dependent attenuation of the received light to provide a corresponding set of filtered light beams each associated with a different filter spectra. Each different filter spectra is a broadband spectrum with substantially non-periodic variations in value as a function of frequency. A broadband light detector receives the set of filtered light beams to provide a corresponding set of independent measures of each filtered light beam. Finally, an electronic computer receives the independent measures of the set of filter light beams to generate a spectrum derived from the set of independent measures, the spectrum indicating intensity as a function of frequency for different light frequencies over a range of frequencies.

It is thus a feature of at least one embodiment of the invention to provide an alternative to standard diffractive or Fourier transform spectrometry using a frequency filter providing a complex non-periodic output.

The different filter spectra are substantially uncorrelated with each other.

It is thus a feature of at least one embodiment of the invention to provide a frequency filter that provides an efficient analysis of a received light signal with a reduced number of different filter spectra.

The different filter spectra may be statistically random.

It is thus a feature of at least one embodiment of the invention to permit the use of novel filter structure designs, for example, those providing complex interference patterns.

The frequency filter may be a set of optical structures arranged so that a given ray of light through the frequency filter interacts sequentially and repeatedly with the optical structures in an optical resonance.

It is thus a feature of at least one embodiment of the invention to provide a spectrometer having an extremely short external optical path made possible by the high internal optical path achievable with optical resonance.

The frequency filter may be a photonic crystal of a matrix with periodic light-disrupting elements.

It is thus a feature of at least one embodiment of the invention to take advantage of the spectral filtering properties of photonic crystals and the like having regular structures.

Alternatively, the frequency filter may provide multiple layers having different refractive indices.

It is thus a feature of at least one embodiment of the invention to permit the use of a wide variety of structures including non-crystalline irregular structures for the generation of the necessary filter spectra.

The electronic computer may include a memory store holding the different filter spectra to generate the spectrum, the different filter spectra being represented in memory by at least one of stored spectral values or an algorithm approximating the spectral values.

It is thus a feature of at least one embodiment of the invention to provide measures of the filter spectra that may be used for constructing the spectrum from highly disorganized filter spectra.

The spectrometer may further include a temperature sensor sensing temperature of the frequency filter, and the memory store may hold different filter spectra associated with different temperatures and the electronic computer selects among the different filter spectra associated with different temperatures according to a temperature measured by the temperature sensor.

It is thus a feature of at least one embodiment of the invention to accommodate temperature sensitivity in the frequency filter by a compensation system.

The electronic computer may generate the spectrum by compressed sensing which reconstructs the spectrum from the set of filter spectra and the set of independent measures by finding a solution to an undetermined system of equations under the assumption of sparseness.

It is thus a feature of at least one embodiment of the invention to allow the construction of the spectrum from multiple measurements subject to complex filter spectra of the type produced by the frequency filter of the present invention.

The broadband light detector may be a two-dimensional array of light sensors in rows and columns across a plane and the frequency filter may be positioned over the light sensors so that different regions of the frequency filter simultaneously provide light to different light sensors of the array and wherein each of the different regions of the frequency filter provides a different filter spectra.

It is thus a feature of at least one embodiment of the invention to provide a robust spectrometer with few or no moving parts. By assigning different filter spectra to different light sensors, the multiple independent measures may be made simply by electronically addressing the different light sensors without moving a filter mechanism.

These particular objects and advantages may apply to only some embodiments falling within the claims and thus do not define the scope of the invention.

DETAILED DESCRIPTION OF THE PREFERRED EMBODIMENT

Figures 1, 2:
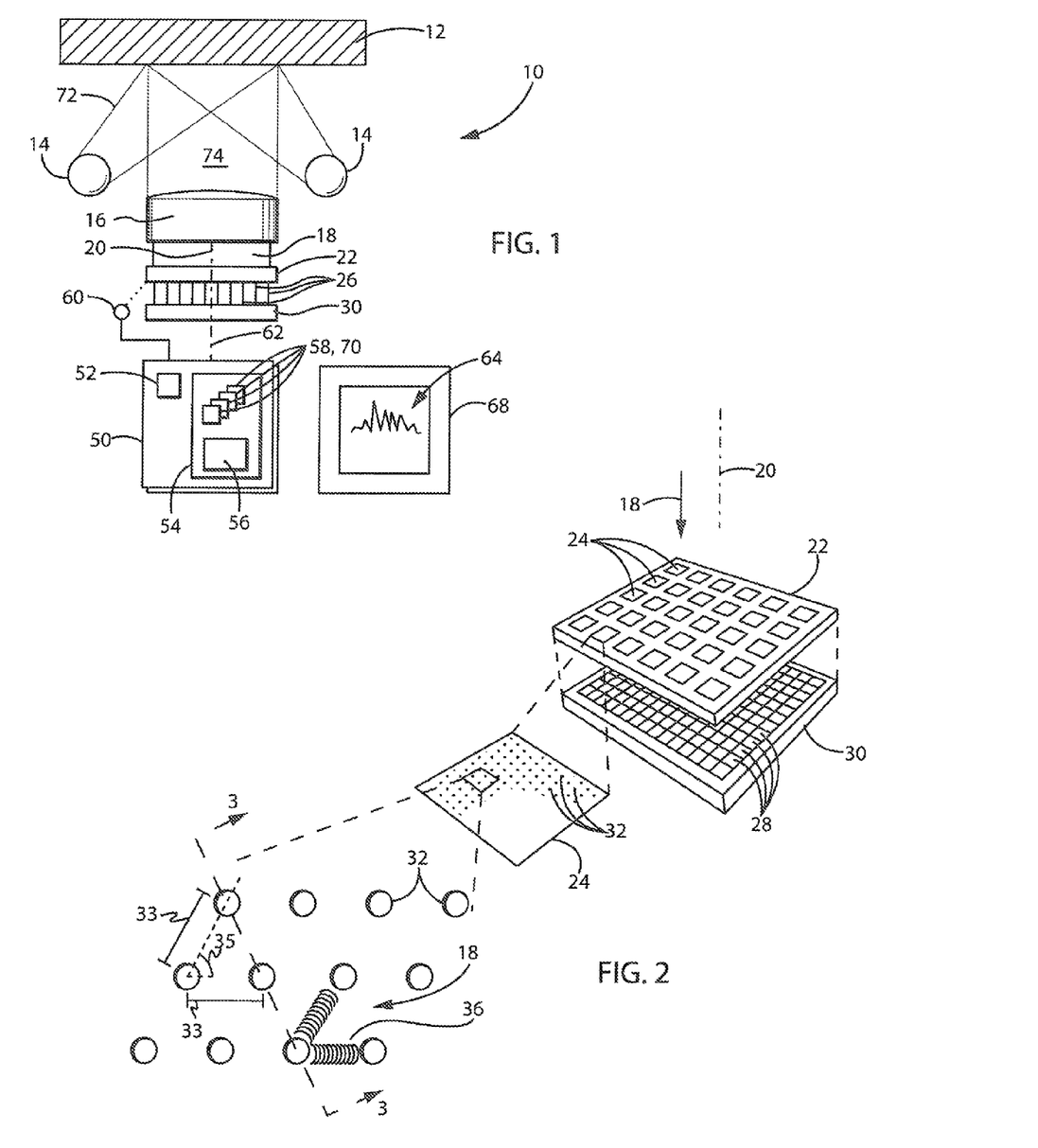
FIG. 1 is a block diagram of a spectrometer constructed according to one embodiment of the present invention providing an integrated frequency filter and light sensor array each with multiple elements.
FIG. 2 is a set of successively exploded perspective views of the frequency filter and light sensor of FIG. 2 showing a detector element in the form of a photonic crystal.

Referring now to FIG. 1, a spectrometer 10 of the present invention may be configured to make absorption spectrographic measurements of a sample material 12. In this configuration, one or more light sources 14 having a known spectral output, for example, light emitting diodes or incandescent bulbs, may shine a light on the sample material 12 to be reflected into a collimator 16. It will be understood that in a minor variation on this arrangement, the light sources 14 may be positioned to transmit light through the sample material 12.

Light from the collimator is directed as a received light beam 18 generally along axis 20 normal to the surface of a generally planar frequency-filter plate 22. The frequency-filter plate 22 may have a set of filter elements 24, for example, in square tiles arranged in rows and columns over the two-dimensional area of the planar frequency-filter plate 22. Each of these filter elements 24 will have a different filter spectrum, being a description of selected light transmission of the filter element 24 as a function of light frequency. The filter elements 24 break the received light beam 18 into a series of filtered light beams 26, the latter each filtered according to the different filter spectra of the filter elements 24.

The filtered light beams 26 may be received by broadband light detector elements 28 of a light detector array 30 being, for example, a charge-coupled device camera or the like. Each of the light detector elements 28 may comprise one or more pixels of that camera device. Generally each of the light detector elements 28 is responsive to light over a range of frequencies to be measured by the spectrometer 10 and is relatively frequency insensitive, being unable to distinguish among different frequencies by frequency measurement. The frequency response of the detector elements 28 need not be uniform for all frequencies, but is desirably well-characterized.

The combination of the frequency-filter plate 22 and the light detector array 30 allows parallel acquisition of multiple independent measures of the filtered light beams 26 each subject to different filter spectra 48 by electronically scanning through the light detector elements 28 as is understood in the art. It will be appreciated that the same approach may be used with a one-dimensional frequency-filter plate 22 and corresponding light detector array 30 each having multiple columns of a single row.

Each filter element 24 may provide for a series of optical structures 32 that affect the propagation of electromagnetic waves from received light beam 18 through the filter elements 24 to create complex interference patterns and optical resonances 36 between structures 32. While the inventor does not wish to be bound by a particular theory, these optical resonances 36 and the standing waves are believed to contribute to the formation of distinct filter spectra by the filter detector elements in the short optical path length through the thickness of the filter element 24 along the axis 20.

Figure 3:
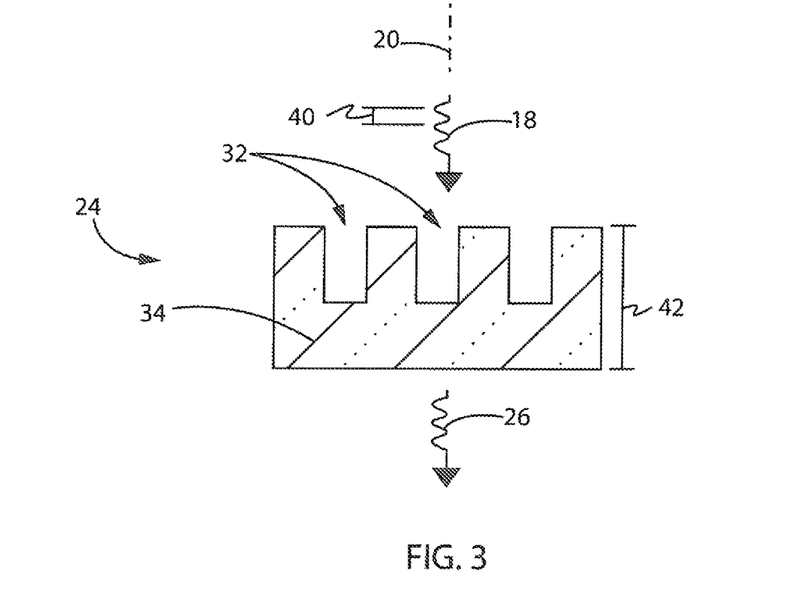
FIG. 3 is a cross-section along a line 3-3 of FIG. 2 of the photonic crystal element.

Referring also to FIG. 3, each of the optical structures 32 may, for example, be a small diameter blind bore hole (circular, rectangular, or other cross-section) in a transparent matrix 34 of the filter element 24. Generally the structures 32 may be placed with a spatial periodicity 33 along two axes separated by an axis angle 35. The spatial periodicity 33 is selected according to the spectral range of the received light beam 18 to be between 1/10 and 10 times the central wavelength 40 of the received light beam 18. The central wavelength 40 is the wavelength of the median frequency of the spectrum to be produced.

In one embodiment, the spatial periodicity 33 may be 2.5 micrometers and the axis angle maybe 60 degrees. The thickness 42 of the filter element 24 will generally be no more than 100 times the central wavelength 40. A typical filter element 24 will have a width and height 100 times periodicity 33 to allow sufficient light flux through the filter element 24.

The multiple filtered light beams 26 may exit each of the filter elements 24 of the frequency-filter plate 22 having a distinct complex filtered spectrum 48 (for example, shown in FIG. 6) as will be discussed below. The filtered spectrum 48 is substantially stable in a very short free-space optical path distance after exiting the filter element 24, for example, less than 10 centimeters and typically much less than one centimeter or at a scale allowing the frequency-filter plate 22 to be directly attached to the light detector array 30. "Free-space" optical path means the optical path length outside of the filter elements 24.

Figure 4:
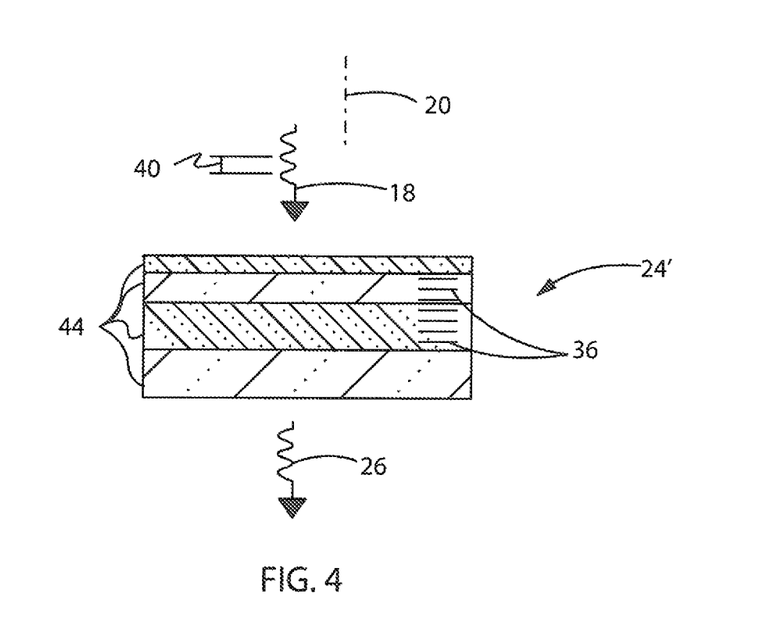
FIG. 4 is a figure similar to that of FIG. 3 showing an alternative multilayer interference element.

Referring now to FIG. 4 in an alternative embodiment, the detector elements 24' may provide for multiple layers 44 generally perpendicular to the axis 20 of the received light beam 18. Each layer 44 may have a different index of refraction so as to create partial reflections at the interfaces between layers 44. In one example embodiment, a top layer may be a 400-nanometer thick layer of silicon followed by a 200-nanometer thick layer of silicon dioxide followed by a 500-nanometer thick layer of silicon followed by a 200-nanometer thick layer of silicon dioxide. Generally each of the layers will have a thickness selected according to the central wavelength 40 to create the desired interference patterns and generally lying between 10 nanometers and 100 micrometers. Each layer creates one response function and together create a complex filtered spectrum 48.

As noted, the interface between each layer creates reflections which generate optical resonances 36 and standing waves. The embodiment of the filter elements 24 uses a non-periodic structure but, again, provides a stable filtered spectrum 48 in a filtered light beam 26 proximate to the exit point at a bottom surface of the filter element 24'.

Figure 6:
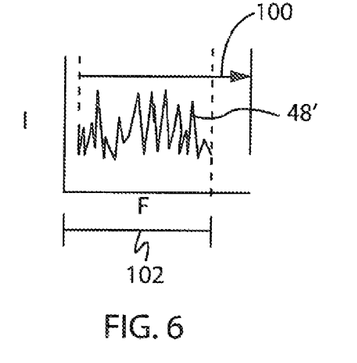
FIG. 6 is a representation of a stored filter spectrum showing correction for temperature.

Referring now to FIGS. 1, and 6, the filter spectra 48 of each of the filter elements 24 may be used to construct a spectrum of the received light beam 18 through the use of an electronic computer 50 (shown in FIG. 1) having one or more processors 52 communicating with a memory 54 holding a stored program 56 as will be described. The memory 54 also includes stored representation 58 of the filter spectra 48 and in some embodiments a measured spectrum 70 of the light sources 14.

The computer 50 may communicate with a temperature sensor 60 for reading a temperature of the frequency-filter plate 22 and may receive independent measures 62 of each filtered light beam 26 from the light detector array 30. As will be discussed below, the computer 50 may then generate a spectrum 64, for example, displayed on a graphics terminal 68 or used in numeric form by other processes. Depending on the application, spectrum 64 may describe either of the (1) intensity of the received light beam 18 as a function of the light frequency, generating a light spectrum or (2) in this example, a difference between a spectrum of the light sources 14 and the received light beam 18 generating an absorption spectrum.

Figure 5:
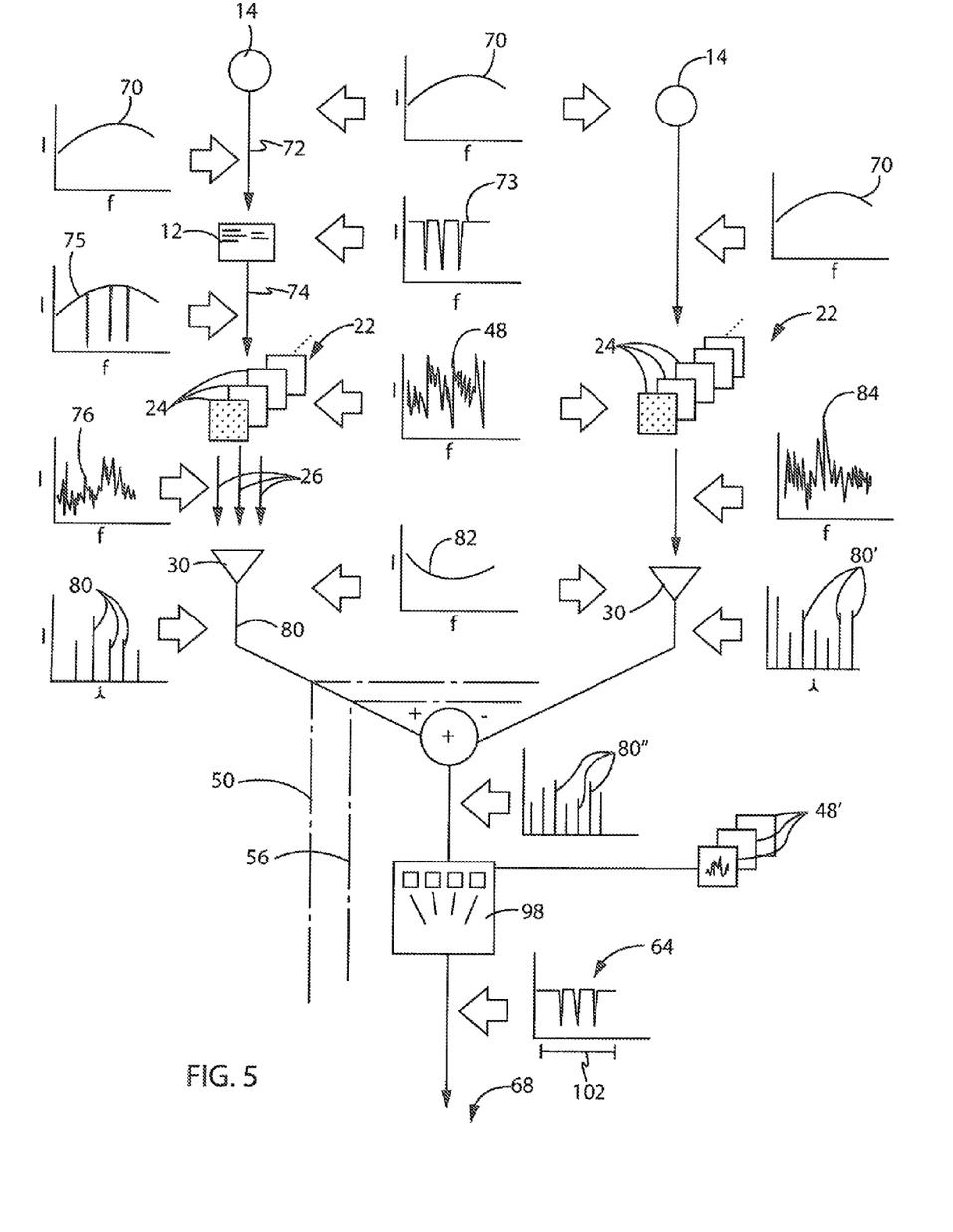
FIG. 5 is a signal processing flowchart showing the generation of a spectrum using the frequency filter of claim 1.

Referring now to FIG. 5, in the example of the generation of an absorption spectrum, the light sources 14 may provide light beam 72 with an emission spectrum 70 that may be transmitted to the sample material 12 to be partially absorbed or reflected by the test sample material 12. This modification of the light beam 72 by the sample material 12 is according to an absorption spectrum 73 of the sample material 12 being an intrinsic property of the sample material 12. Generally the spectrum 64 therefore is a measure of the absorption spectrums 73. As is understood in the art, this absorption spectrum 73 may be used to identify or otherwise characterized the sample material 12.

Reflected or transmitted light 74 from the sample material 12 will have a spectrum 75 being a combination of the emission spectrum 70 and the spectrum 73. This light 74 may be received by the detector elements 24 of the frequency-filter plate 22. As noted above, each of the detector elements 24 have a different filter spectrum 48 and create a set of filtered light beams 26 each having a characteristic spectrum 76 being generally a combination of spectra 70, 73, and 48 for the particular filter element 24. These filtered light beams 26 are received by the light detector array 30 which generates multiple independent measures 80 of the light intensity of the filtered light beams 26 (each independent measure indicated by a different index variable i) associated with different filter elements 24. The independent measures 80 will generally be the integral of the spectrum 76 over the area of the detector element 28 as slightly modified by the sensitivity spectrum 82 of the detector elements 28 of the light detector array 30.

These above-described steps may be repeated for each test of the sample material 12 or different sample material 12.

For the generation of an absorption spectrum 64, the filter characteristics of the optical path from the light source 14 through the filter elements 24 and the light detector array 30 must be characterized without the sample material 12. This latter measurement may generate a set of different independent measures 80' corrected for the particular light source 14 and light detector array 30. In particular, the light source 14 may be used to directly illuminate the frequency-filter plate 22 to generate a working filter spectrum 84 for each of the filter elements 24 which may then be detected by each of the detector elements 28 to generate the independent measures 80' for each of the filter elements 24.

The independent measures 80' may be subtracted from the independent measures 80 to determine difference independent measures 80" for each filter element 24 according to the index variable i and representing the modification of the light beam 72 by the sample material 12 as may be expressed in an absorption spectrum 64. In the case of the generation of a light spectrum, the subtraction process and the collection of independent measures 80' is not required.

Figure 9:
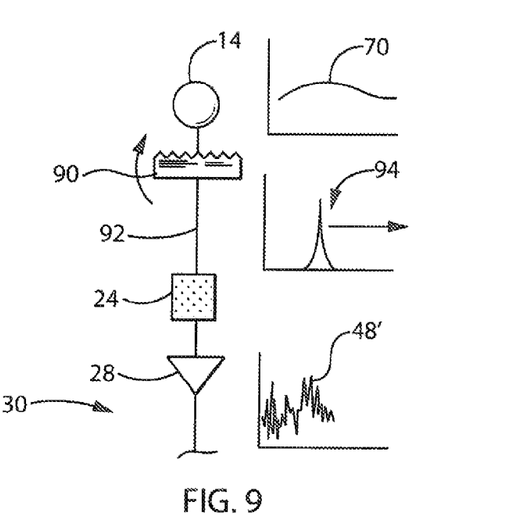
FIG. 9 is a signal processing flowchart similar to that of FIG. 5 showing characterization of each of the elements of the frequency filter array.

The difference independent measures 80" may then be analyzed to determine the spectrum 64. As part of this process, each of the filter spectra 48 augmented by the effects of the spectra 70 and 82 must be determined. Referring to FIG. 9, this step may be accomplished, for example, using conventional spectrographic techniques such as a scanning slit spectroscopy machine or a Fourier transform spectroscopy machine. With a scanning slit system (as depicted in FIG. 9), broadband light source 14 having emission spectrum 70 may be received by a scanning slit monochromator 90 of a type known in the art to produce a time-varying monochromatic light beam 92 indicated by dynamic spectrum 94. This time-variable monochromatic light beam 92 may be received by each filter element 24 and the resulting transmission through the filter element 24 detected by detector element 28 to determine a corrected filter spectra 48' collectively describing the filter spectra 48 as influenced by the effective emission spectrum 70 of the light source 14 and sensitivity spectrum 82 of the light detector array 30. More simply, the corrected filter spectra 48' is the product of filter spectra 48, emission spectrum 70 and sensitivity spectrum 82. Alternatively, or in addition, each of the filter spectra 48, emission spectrum 70, and sensitivity spectrum 82 may be determined independently, for example at the factory, using a conventional spectroscope, and the necessary combined effect of these associated components.

Referring back to FIG. 5, each of the corrected filter spectra 48' may be used with the independent measures 80 to deduce the spectrum 64 by a variety of techniques that attempt to solve for an absorption spectra 64 that could generate independent measures 80" given the known corrected filter spectra 48'. Generally this problem is represented by a system of linear equations:

$$V_1 \cdot S = a_1$$

$$V_2 \cdot S = a_2$$

$$V_2 \cdot S = a_2$$

(etc.)

where $V_i$ are the corrected filters spectra 48', $a_j$ are the independent measures 80" and S is the absorption spectrum 64. This system of linear equations will generally be an undetermined linear system, that is, having more unknowns than equations and therefore an infinite number of solutions. In order to choose a solution, a compressed sensing program 98 may be used with an additional assumption of smoothness or sparseness of the absorption spectrum 64. The smoothness or sparseness assumption basically allows the user to arbitrarily set a resolution of the ultimate absorption spectrum 64.

One type of compressed sensing is minimum basis pursuit, generally known in the art and described, for example, in Candes, E. J.; Romberg, J.; Tao, T., Robust Uncertainty Principles: Exact Signal Reconstruction From Highly Incomplete Frequency Information, IEEE Transactions on Information Theory (Volume: 52, Issue: 2), pages 489-509 (February 2006).

Referring now to FIG. 6, the particular corrected filter spectra 48' will be a function of temperature of the spectrometer 10 and primarily the temperature of the frequency-filter plate 22. Generally, at higher temperatures, expansion of the material of the transparent matrix 34 (shown in FIG. 3) will cause a dilation 100 of the corrected filter spectrum 48'. Accordingly, a number of different corrected filter spectra 48' may be stored for use by the compressed sensing program 98, each stored corrected filter spectrum 48' being associated with different temperatures measured by temperature sensor 60 contemporaneously with the acquisition of the received light beam 18 during the process of FIG. 9. The multiple measurements at different temperatures may be stored as data points in a lookup table, or compressed algorithmically to provide for a method of generating corrected filter spectra 48' procedurally, for example, providing a dilation based on temperature) according to techniques well known in the art.

Figure 7:
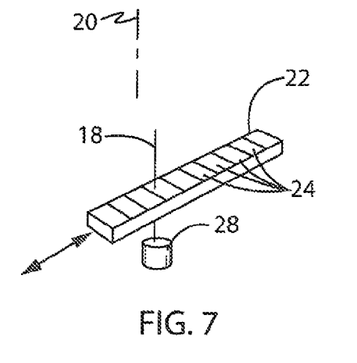
FIG. 7 is an alternative embodiment of the spectrometer using a single broadband detector and movable filter.

Referring now to FIG. 7, in an alternative embodiment of the spectrometer 10, a single detector element 28 may be used and a frequency-filter plate 22, for example, having a linear array of detector elements 24, may be mechanically indexed with respect to a single detector element 28 for successive characterizations of the received light beam 18 along axis 20. This approach reduces the need for multiple light detector elements 28 and/or allows for a single more expensive and possibly more linear light detector element 28.

Figure 8:
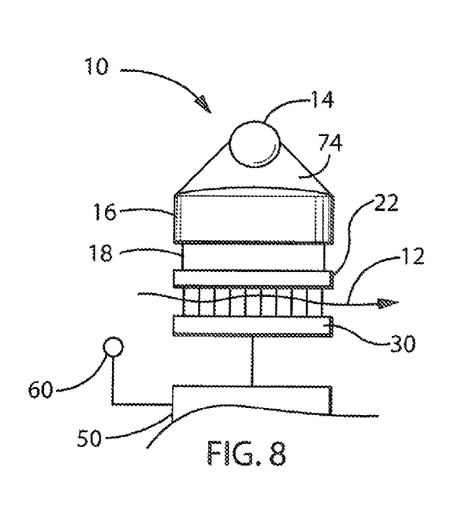
FIG. 8 is an alternative optical path for the spectrometer in which a material to be analyzed is placed in an optical path between the filter system and the light detector.

Referring now to FIG. 8, it will be appreciated that the spectrometer 10 described above may be used to characterize the spectrum of a light source 14 (a light spectrum) that is unknown and directed directly into collimator 16 (as mentioned above). Alternative, the spectrometer 10 may be used to generate an absorption spectrum with sample material 12 located along an optical path between the frequency-filter plate 22 and the light detector array 30 with substantially the same analysis as described above.

Referring now again to FIG. 6, generally the filter spectra 48 and thus the corrected filter spectra 48' are extremely complex compared to the monochromatic filter spectra produced by an optical grating or the sinusoidal filter spectra produced by an interferometer used with Fourier transform spectroscopy. The filter spectra 48 and 48' are generally broadband covering a full range of frequencies 102 that will be measured in the spectra 64 and non-periodic, that is a spectrum of the spectra 48 would indicate multiple frequencies not a single frequency or filter spectra 48 and 48' would not exhibit any strong autocorrelation peaks. Generally the spectra 48 and 48' appear to be random and are statistically random. A statistically random sequence is one that contains no recognizable patterns or regularities but may not necessarily be truly random.

The depictions of the spectra 48 and 48' in the figures are highly simplified and should not be relied upon for understanding the actual spectra. As used herein, the term photonic crystal means a structure having periodic dielectric or other structures that disrupt the propagation of electromagnetic waves by absorption and scattering or the like.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to an electronic computer can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What I claim is:

1. A spectrometer comprising:
   a frequency filter, having a set of spatially separated regions, each region receiving light and modifying the light according to a set of different filter spectra each defining a frequency-dependent attenuation of the received light to provide a corresponding set of filtered light beams each associated with a different filter spectra, each filtered light beam of the corresponding set of filtered light beams providing light scattered by substantially only one of the spatially separated regions;
   a broadband light detector receiving the set of filtered light beams to provide a corresponding set of independent measures of each filtered light beam;
   an electronic computer executing a program stored in non-transient memory to receive the independent measures of the filtered light beams to generate a spectrum derived from the set of independent measures, the spectrum indicating intensity as a function of frequency for different light frequencies over a range of frequencies wherein the electronic computer configured to reconstruct the spectrum from the independent measures by finding a solution to an undetermined system of equations under an assumption of sparseness;
   wherein each different filter spectra is a broadband spectrum with substantially non-periodic variations in value as a function of frequency;
   wherein the frequency filter provides a planar light transmitting substrate extending in a plane in two dimensions perpendicular to a propagation of the filtered light beams with the spatially separated regions displaced in the two dimensions along the plane and wherein the broadband light detector receives light in the two dimensions over the plane at independent light sensors displaced in the two dimensions each light sensor associated with only one of the spatially separated regions; and
   wherein the frequency filter provides more than two layers separated perpendicularly to the two dimensions with adjacent layers having different refractive indices.

2. The spectrometer of claim 1 wherein the different filter spectra are substantially uncorrelated with each other.

3. The spectrometer of claim 1 wherein the different filter spectra are statistically random.

4. The spectrometer of claim 1 wherein the frequency filter comprises a set of optical structures arranged so that a given ray of light through the frequency filter interacts sequentially and repeatedly with the optical structures in an optical resonance.

5. The spectrometer of claim 1 wherein the electronic computer provides a memory store holding the different filter spectra to generate the spectrum, the different filter spectra represented in memory by at least one of stored spectral values or an algorithm approximating the spectral values.

6. The spectrometer of claim 5 further including a temperature sensor sensing temperature of the frequency filter and wherein the memory store holds different filter spectra associated with different temperatures and the electronic computer selects among the different filter spectra associated with different temperatures according to a temperature measured by the temperature sensor.

7. The spectrometer of claim 1 wherein the electronic computer generates the spectrum by compressed sensing which reconstructs the spectrum from the set of filter spectra and the set of independent measures by finding a solution to an undetermined system of equations under an assumption of sparseness.

8. The spectrometer of claim 1 wherein the broadband light detector is a two-dimensional array of light sensors in rows and columns across a plane and the frequency filter is positioned over the light sensors so that different regions of the frequency filter simultaneously provide light to different light sensors of the array and wherein each of the different regions of the frequency filter provides a different filter spectra.

9. The spectrometer of claim 8 wherein the broadband light detector is a light transmissive plate attached to a CCD sensor so that a plane of the light transmissive plate is substantially parallel to a plane of the CCD sensor so that light passing through the plate is received by the CCD sensor.

10. The spectrometer of claim 1 wherein all components of the frequency filter are fixed with respect to the broadband light detector.

11. The spectrometer of claim 1 wherein a free space optical path between the broadband light source and the broadband light detector is less than 10 cm.

12. The spectrometer of claim 1 wherein the spectrum provides one of a light spectrum of the received light and an absorption spectrum indicating a difference between a known spectrum of a broadband light source and a modified spectrum of the broadband light source as changed by absorption of light from the broadband light source by a sample material.

13. The spectrometer of claim 1 wherein the more than two layers have a nonperiodic separation perpendicular to the two dimensions.

14. A method of measuring a spectrum using a spectrometer having:

a frequency filter, having a set of spatially separated regions, each region receiving light and modifying the light beam according to a set of different filter spectra each defining a frequency-dependent attenuation of received light to provide a corresponding set of filtered light beams each associated with a different filter spectra each filtered light beam of the corresponding set of filtered light beams providing light scattered by substantially only one of the spatially separated regions;

a broadband light detector receiving the set of filtered light beams to provide a corresponding set of independent measures of each filtered light beam;

an electronic computer executing a program stored in non-transient memory to receive the independent measures of the received light to generate a spectrum derived from the set of independent measures, the spectrum indicating intensity as a function of frequency for different light frequencies over a range of frequencies;

wherein each different filter spectra is a broadband spectrum with substantially non-periodic variations in value as a function of frequency;

wherein the frequency filter provides a planar light transmitting substrate extending in a plane in two dimensions perpendicular to a propagation of the filtered light beams with the spatially separated regions displaced in the two dimensions along the plane and wherein the broadband light detector receives light in the two dimensions over the plane at independent light sensors displaced in the two dimensions each light sensor associated with only one of the spatially separated regions, and wherein the frequency filter provides more than two layers separated perpendicularly to the two dimensions with adjacent layers having different refractive indices; the method comprising:

(a) illuminating a sample material to obtain multiple independent measures of each filtered light beam;

(b) comparing the multiple independent measures of each light signal to known different filter spectra to produce partial spectra indicating selective frequency attenuation of a broadband light signal by the filter spectra and the sample material; and (c) combining the partial spectra into the spectrum wherein the electronic computer reconstructs the spectrum from the independent measures by finding a solution to an undetermined system of equations under an assumption of sparseness.

15. The method of claim 14 wherein the combination of the partial spectra is provided by compressed sensing which reconstructs the spectrum by finding a solution to an undetermined system of equations under an assumption of sparseness.

16. The method of claim 15 wherein the frequency filter provides a set of optical structures arranged so that a given ray of light through the frequency filter interacts sequentially and repeatedly with the optical structures in an optical resonance.

17. The method of claim 16 wherein the different filter spectra are statistically random.

18. The method of claim 14 including the step of measuring a temperature of the frequency filter and correcting the different filter spectra to compensate for that temperature.

19. A spectrometer comprising:

a frequency filter, having a set of spatially separated regions, each region receiving a light beam and modifying the light beam by an optical resonance process to a set of different filter spectra each defining a frequency-dependent attenuation of received light to provide a corresponding set of filtered light beams each associated with a different filter spectra, each filtered light beam of the corresponding set of filtered light beams providing light scattered by substantially only one of the spatially separated regions, wherein the frequency filter is a plate having different regions providing different filter spectra;

a broadband light detector receiving the set of filtered light beams to provide independent measures of each filtered light beam; wherein the broadband light detector is a two-dimensional array of light sensors in rows and columns across a plain and the frequency filter is positioned over and attached to the light sensors so that different regions of frequency filter simultaneously provide light to different light sensors of the array;

wherein the frequency filter provides a planar light transmitting substrate extending in a plane in two dimensions perpendicular to a propagation of the filtered light beams with the spatially separated regions displaced in the two dimensions along the plane and wherein the broadband light detector receives light in the two dimensions over the plane at independent light sensors displaced in the two dimensions each light sensor associated with only one of the spatially separated regions; wherein the frequency filter provides more than two layers separated perpendicularly to the two dimensions with adjacent layers having different refractive indices; and an electronic computer executing a program stored in non-transient memory to receive the independent measures of the received light to generate a spectrum derived from the set of independent measures, the spectrum indicating intensity as a function of frequency for different light frequencies over a range of frequencies wherein the electronic computer configured to reconstruct the spectrum from the independent measures by finding a solution to an undetermined system of equations under an assumption of sparseness.

* * * * *